United States Patent Office 2,944,998
Patented July 12, 1960

2,944,998
STABILIZED CURED POLYURETHANES

Edwin C. Buxbaum, Wilmington, Del., assignor to E. I. du Pont de Nemours and Company, Wilmington, Del., a corporation of Delaware No Drawing. Filed June 30, 1958, Ser. No. 745,258

8 Claims. (Cl. 260—45.8)

This invention is directed to a new composition of matter, polyurethane products stabilized against discoloration and deterioration caused by acidic gas fumes; among such products are foams and fibers.

Polyurethane foams are readily becoming an important article of commerce. Rigid polyurethane foams are being used increasingly for thermal insulation and acoustical tile. Resilient polyurethane foams are finding applications as clothing innerliners, pillows, mattresses and the like.

Polyurethane foams are white when new; however, on exposure to ambient atmospheric conditions they gradually turn brownish-yellow and such change of color makes them less attractive for use. Furthermore, the physical properties of the discolored portions are not as good. Resilient foams, for example, become less resilient, their load strength decreases, and their compression set increases; eventually such foams may be entirely unsuitable for use. This deterioration has been observed to occur indoors in the absence of direct sunlight. It is, therefore, probably not caused by exposure to ultraviolet light. Instead, it is believed to result from the presence of small amounts of acidic gas fumes in the air produced by the oxidation of nitrogen; this oxidation occurs during electrical discharges and the combustion of coal, gas, oil and other fuels.

Heretofore, the polyurethane foams have not been protected against this type of deterioration. This shortcoming has markedly detracted from both their appeal and their commercial utility. It is, therefore, an object of the present invention to protect polyurethane products from discoloration and deterioration. It is another object to protect polyurethane products from discoloration and deterioration caused by nitrogen oxides in the atmosphere. It is still another object to protect polyurethane foams from discoloration and deterioration caused by exposure to ambient atmospheric conditions in the absence of direct sunlight. It is an additional object to protect polyurethane products from discoloration and deterioration caused by exposure to acidic combustion gases. It is a still further object to protect polyurethane foams and fibers from discoloration and deterioration caused by the acidic combustion products of coal, oil, and natural gas.

These and other objects will become apparent in the following description and claims.

More specifically, the present invention is directed to a polyurethane product stabilized toward acidic gas fumes by having incorporated therein from about 0.1 to 2% by weight of a compound taken from the group consisting of a compound having the structure (A) 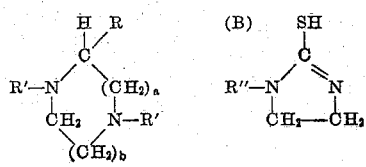

(B) 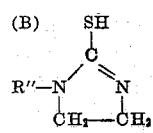

and (C) 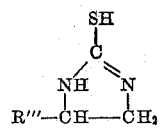

wherein R is H, arylene or lower alkyl; R' is arylene; R'' is lower aliphatic; R''' is H or lower alkyl; $a=0, 1$; $b=1, 2$; with the proviso that when $a=0$, $b=1$ or 2 and when $a=1$, $b=2$.

Both rigid and resilient foams may be stabilized toward discoloration and deterioration by incorporation of described imidazoles and imidazolidines. These stabilizers may be incorporated either before or after the formation of the foam. In the latter case, the stabilizer is homogeneously dispersed in the cellular resin itself, by immersing the foam in a stabilizer solution, withdrawing the foam, and afterward evaporating the solvent from it. Optionally, the foam may be sprayed with a solution of the stabilizer and the solvent subsequently evaporated. Only the surface is protected. It is more convenient to incorporate the stabilizers before the foam is made. The foam stabilizer is then added as one of the components of the foamable mixture along with the water, basic catalysts, surfactants, cell regulators, pigments and the like.

The amount of stabilizer added according to this invention ranges from about 0.1 to 2% by weight of the foam. If less than 0.1 part is employed less satisfactory protection is attained. It is generally unnecessary to add more than 2% by weight to achieve effective stabilization. It is to be understood that the incorporation of the stabilizers in the foamable composition does not discolor the polyurethane foams attained nor does it have any adverse effect upon their properties.

Representative examples of the stabilizers follow. 1,3-di-(p-tolyl)-2 - methyl-imidazolidine, 1,3 - di(m - chlorophenyl)-imidazolidine, 1,3 - di - (o-tolyl)-2-isopropyl-imidazolidine, 1,3 - di - (p-methoxyphenyl)-2-n-butyl-imidazolidine, 1,3 - di - (m-tolyl)-2-methyl-hexahydropyrimidine, 1,4-di-(p-tolyl)-2-methyl-homopiperazine, 4 - ethyl-2-mercaptoimidazoline, 1-methyl-2-mercapto-imidazoline, 1,3-diphenyl - 2 - methylimidazolidine, 1,3-diphenyl - 2-propylimidazolidine, 1,3 - diphenylhexahydropyrimidine, 1,4-diphenyl - 1,4 - homopiperazine, 1,2,3 - triphenylimidazolidine, 4-methyl-2-mercaptoimidazoline, 2 - mercaptoimidazoline, 1 - (2-hydroxyethyl)-2-mercaptoimidazoline, and 1-phenyl-2-mercaptoimidazoline.

The water foamable isocyanate terminated polyurethane compositions which are used to prepare the stabilized cellular materials of the present invention are obtained by agitating an arylene polyisocyanate (usually a diisocyanate) with an organic compound containing a plurality of alcoholic hydroxyl groups. The proportions of the reactants are such that the overall ratio of the number of free isocyanate groups to the number of alcoholic hydroxyl groups is greater than 1.0.

The polyol may be a hydroxyl terminated polyurethane, a hydroxyl terminated polyester, a polyalkyleneether glycol, a polyalkyleneether aryleneether glycol, a polyalkyleneether thioether glycol, or a polyalkylenearyleneether thioether glycol. In addition, fatty acid triglycerides having a hydroxyl number of at least 49 may be used. These triglycerides may be either a naturally occurring oil such as castor oil or they may be a blown drying oil of the type known in the trade as "heavy bodied" oils, such as blown linseed, tung, poppyseed, hempseed, soya oils and the like.

Foamable compositions made from castor oil are disclosed in U.S. 2,788,335 and U.S. 2,787,601. Additional suitable polyols are: tetrols made by reacting ethylenediamine sequentially with ethylene oxide and propylene oxide; tetrols made by reacting pentaerythritol with ethylene oxide; triols made by reacting trimethylolalkanes with propylene oxide. Mixtures of polyols may be used.

When preparing the foams in the preferred manner a stream containing the isocyanate terminated polyurethane composition is generally fed along with the color stabilizer and inert ingredients, such as surfactants, plasticizers, cell regulating agents, fillers, etc., into a conventional mixing head. There it is blended with a separate stream which contains the catalyst and water. The homogeneous foamable composition obtained is deposited from the mixing head into the mold. Hand mixing may be employed in place of a mixing head, if desired.

The foams may also be prepared by the reaction of an isocyanate terminated polyurethane with a polyol and water.

The isocyanate terminated polyurethane composition and the polyol are fed simultaneously by separate streams into the mixing head; the water and catalyst are usually contained in the polyol stream; the color stabilizer and the inert ingredients mentioned above may be present in either stream or both; optically, the water and catalyst may be introduced by one or more streams which enter the mixing head at the same time as the isocyanate terminated polyurethane stream and the polyol stream. The relative amounts of the polyol and isocyanate streams used are selected so that enough free isocyanate groups are provided to react with all the hydroxyl groups and to provide the carbon dioxide needed for expanding the foam. When conventional mixing equipment is used, these compounds are fed by separate streams to the mixing chamber where they are blended. The polyol used in this process may be a polymeric glycol of the kind mentioned above or it may be a hydroxyl terminated polyurethane prepared by reacting a molar excess of the polymeric glycol with a polyisocyanate. It is to be understood that monomeric polyisocyanates such as toluene-2,4-diisocyanate may also be present in the component containing the isocyanate terminated polyurethane. In general, the free isocyanate content of the foamable compositions ranges from about 3% to 25% by weight. The preferred range is from about 7 to 17%.

The temperature at which the ingredients are maintained prior to mixing is usually not critical over a temperature range of about 25–50° C. The temperature selected will be determined by operating convenience. For example, it is easier to pump some prepolymers if their viscosity has previously been decreased by heating them to a temperature of about 35° C. In general, it is desirable to operate at a temperature as near room temperature as possible in order to delay the onset of foaming.

When preparing the cellular materials from the water foamable polyisocyanate polyurethane compositions it is generally desirable to employ a catalyst. These catalysts may be selected from a wide variety of tertiary amines, such as N-methyl morpholine, triethylamine, diethylethanolamine, and diethanolamine. Mixtures of two or more catalysts may be used. It is often desirable to employ a buffered catalyst when making a rigid foam. This catalyst is made by partially neutralizing a tertiary amine with a strong mineral acid, such as hydrochloric acid. N-methylmorpholine, alone or in combination with triethylamine is the preferred catalyst for the formation of resilient foams. The preferred buffered catalyst is a 50% aqueous solution of diethylethanolamine hydrochloride and diethylethanolamine present in a 2:1 molar ratio.

In certain cases it may eb desirable to delay the foaming until the foamable composition has entered a heated zone. This requirement is best met by employing an isocyanate composition free from catalytic impurities and by using a thermally activated catalyst, that is, one which has to be heated above room temperature to be effective. Certain water soluble tertiary amines substituted by an amide group are suitable. Representative examples are 3-morpholinopropionamide and 2-diethylaminoacetamide. About 1–2% of these catalysts is used by weight of the foamable composition. Another type of thermally activated catalyst which may be used is a water soluble salt made by reacting a carboxylic acid of first pKa 3–5 with a tertiary amine of pKb 3–7. Representative examples are trimethylamine formate, trimethylamine acetate, triethylamine formate, triethylamine acetate, N-methylmorpholine acetate, N-methylmorpholine citrate, trimethylamineethylenediamine tetraacetate, and trimethylamineimino triacetate. The amount of catalyst used is based on the tertiary amine available as the salt. A recommended catalyst concentration is 0.25 to 1.1 parts available tertiary amine for each 100 parts by weight of the foamable composition. The heated zone should be maintained at a temperature between about 60–70° C. when these catalysts are used.

Dispersion of the catalyst and water in the polyisocyanate composition may be improved by incorporating surfactants, such as ethylene oxide condensation products. The addition of silicones such as polydimethylsiloxane (50 centistokes grade) is helpful in obtaining a finer cell structure in the ultimate product.

Theoretically, 0.5 mole of water is needed for each mole of free isocyanate groups present in the foamable composition. Generally, about 0.5 to 1.5 moles of water can be supplied; about 0.6 to 1.0 mole is preferable. It is to be understood that "free" isocyanate groups are those isocyanate groups which are available to react with water. When a polyol is present during the foaming reaction, its hydroxyl groups will react with the isocyanate groups to form urethanes; the number of moles of hydroxyl groups present in the foamable composition is subtracted from the total number of moles of isocyanate groups also present to get the number of moles of "free" isocyanate groups.

The isocyanate-terminated polyurethanes are prepared by agitating an organic polyol with a molar excess of an arylene diisocyanate. Mixtures of polyols or arylene diisocyanates or both may be used, optionally. The reaction is carried out in a dry vessel protected from atmospheric moisture. About 1 to 2 hours is required to complete the reaction at 100° C. A correspondingly longer time is needed below 100° C., e.g., about 4 to 8 hours at 70° C. Optionally, the reaction can be carried out at temperatures above 100° C. to shorten the time required and to introduce additional crosslinking by side reactions such as allophanate formation which becomes quite noticeable at about 140° C. Optionally, the process may be carried out in more than one step. A hydroxyl terminated polyurethane may be made by reacting the arylene diisocyanate with a molar excess of the organic polyol. This polyurethane, in turn, may be reacted with a molar excess of an arylene diisocyanate or an isocyanate terminated polyurethane.

The useful polyalkyleneether glycols may be represented by the formula $HO(RO)_nH$ where R is an alkylene radical containing up to 10 carbon atoms and $n$ is an integer sufficiently large that the molecular weight of the polyalkyleneether glycol is about 750 to 10,000. All the alkylene radicals need not be the same. When resilient foams are prepared, the preferred polyalkyleneether glycols have molecular weights ranging from about 1000 to 4000; when rigid foams are made, the preferred polymeric glycols have molecular weights ranging from about 750 to 2000. Representative examples of these glycols are polypropyleneether glycol, 1,2-polydimethylethyleneether glycol, ethylene oxide modified poly-1,2-propyleneether glycol, polytetramethyleneether glycol, polypentamethyleneether glycol, and polytetramethyleneformal glycol. These polyalkyleneether glycols are made by the polymerization of cyclic ethers such as alkylene oxides or dioxolane or by acid-catalyzed condensation of the glycols.

The polyalkyleneether thioether glycols may be represented by the formula $HO(GY)_nH$, where G represents hydrocarbon radicals at least some of which are alkylene, Y represents sulfur or oxygen, and n is an integer sufficiently large so that the glycol has a molecular weight of about 750 to 10,000. The preferred molecular weight ranges given above for polyalkyleneether glycols are applicable here. The preparation of representative glycols is described in French Patent 1,128,561.

The polyalkylenearylene glycols are similar to the polyalkyleneether glycols except that some arylene radicals are present. Phenylene, naphthalene and anthracene radicals may be used with or without substituents such as alkyl or alkylene groups, and, in general, there should be at least one alkyleneether radical having a molecular weight of about 500 for each arylene radical which is present. When part of the other oxygens are replaced with sulfur a polyalkylenearyleneether, thioether glycol results, which also may be used in the present invention.

The polyesters containing a plurality of hydroxyl groups which are useful in the present invention are made from organic polyols and polybasic carboxylic acids by the usual methods of condensation polymerization. For example, a molar excess of 1,4-butanediol is reacted with adipic acid. Optionally, a small amount of a triol, for example, trimethylolpropane, may be included to provide crosslinking; one molar equivalent for each 3000 to 12,000 molecular weight units of polyester is recommended, for intermediataes for resilient foams. Representative examples of useful diols are ethylene glycol, 1,2-propylene glycol, 1,3-propanediol, 1,2-butylene glycol, 1,4-butanediol, thiodiglycol, diethylene glycol, and 1,2-alkylene oxide modified glycols.

Representative examples of useful polyols are glycerol, trimethylolpropane, trimethylolethane, pentaerythritol and 1,2-alkylene oxide modified glycerol. Representative examples of useful dicarboxylic acids are oxalic acid, malonic acid, succinic acid, glutaric acid, adipic acid, pimelic acid, suberic acid, aselaic acid, sebacic acid, fumaric acid, maleic acid, and phthalic acid. Anhydrides of carboxylic acid may be employed in place of the acids; succinic anhydride and phthalic anhydride are representative examples. When rigid foams are desired the polyester polyol is prepared from polyhydric compounds (containing at least 3 alcoholic hydroxyl groups) and a dicarboxylic acid; optionally, a small amount of a diol (e.g., ethylene glycol) may be included.

Representative organic polyisocyanates which may be used to prepare these water foamable compositions include compounds such as toluene-2,4-diisocyanate, 1,5-naphthalene diisocyanate, cumene-2,4-diisocyanate, 4-methoxy-1,3-phenylenediisocyanate, 4-chloro-1,3-phenylenediisocyanate, 4-phenoxy-1,3-phenylenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenyl ether, benzidinediisocyanate, 4,6-dimethyl-1,3-phenylenediisocyanate, 9,10-anthracenediisocyanate, 4,4'-diisocyanatodibenzyl, 3,3-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl 3,3'-dimethoxy-4,4'-diisocyanatodiphenyl, 1,4-anthracenediisocyanate, 2,5-fluoroenediisocyanate, 1,8-naphthalenediisocyanate, and 2,6-diisocyanatobenzfurane. Mixtures of two or more polyisocyanates may be employed. The preferred diisocyanate is toluene-2,4-diisocyanate. The preferred isomer mixture contains 80% toluene-2,4-diisocyanate, and 20% toluene-2,6-diisocyanate. Triisocyanates such as toluene-2,4,6-triisocyanate and 2,4,4'-triisocyanatodiphenyl-ether may be used to provide additional crosslinking.

The following representative examples will better illustrate the nature of the present invention: however, the invention is not intended to be limited to these examples. Parts are by weight unless otherwise indicated.

The measurements on the properties of the cured foams are made in accordance with the following ASTM methods:

Compression set by D-395-55, Method B
Compression modulus B-575-46, Method B

GAS FUME EXPOSURE TESTS

Foam samples 1 x 2 x 3 in. in size are suspended in a chamber, where they are exposed to the fumes of a small gas burner at a temperature of 48-52° C. for 16 hrs. to 160 hrs. This test represents an accelerated test for the decomposition of polyurethane materials by nitrogen oxide gas fumes.

EXAMPLE 1

A. *Preparation of prepolymer 1–A*

Prepolymer A is made in a dry reaction vessel protected from atmospheric moisture. 3000 parts of polytetramethyleneether glycol of number-average molecular weight 3000 (water content less than 0.05% by weight) and 348 parts of an 80:20 mixture of toluene-2,4-diisocyanate and toluene-2,6-diisocyanate are agitated at 60° C. for 2 hours. An additional 35 parts of a toluenediisocyanate isomer mixture is introduced and agitation is continued at 140° C. for 2 more hours. The mass is then cooled to room temperature and standardized to 13% free isocyanate content by the addition of 482 parts of the toluenediisocyanate isomer mixture.

B. *Preparation of polytetramethyleneether polyurethane foam 1–B*

100 parts of prepolymer 1–A, 0.5 part of polydimethylsiloxane (50 centistokes grade), 2.25 parts of water, 1 part of N-methylmorpholine and 0.1 part of triethylamine are mixed together at room temperature. The composition obtained is poured into a wax-lined mold where it subsequently expands to give a resilient foam with a density of about 2.5 lbs./cu. ft. One hour after the foaming has been completed, the foam 1–B is stripped from the mold and cured at 100° C. for 17 hours.

C. *Introduction of the stabilizer*

The polyalkyleneether polyurethane foam prepared in Part 1–B above is immersed for about 2 minutes at room temperature in a 1% ethanolic solution of 1,3-diphenyl-2-methylimidazolidine. The foam is then removed, the excess solution is squeezed out, and the foam is dried.

D. *Gas fume aging of the foam*

The polyurethane foams prepared in Parts 1–B and 1–C above are exposed to burner gas fumes for 160 hours. The foam sample 1–B then exhibits a modulus of 0.27 lb./cu. ft. at 25% compression and a modulus of 0.42 lb./cu. ft. at 50% compression. Its compression set is 98%. The modulus of foam 1–C, after exposure, is 0.5 lb./cu. ft. at 25% compression; 0.63 lb./cu. ft. at 50% compression. Its compression set is 56%.

E. *The use of alternative stabilizers*

When 1% ethanolic solutions of 1,3-diphenyl-2-propylimidazolidine, 1,3-diphenylhexahydropyrimidine, 1,4-diphenyl-1,4-homopiperazine, and 1,2,3-triphenylimidazolidine are substituted for the 1% ethanolic solution of 1,3-diphenyl-2-methyl-imidazolidine in the procedure of Part 1–C above, the load strength and compression set of the treated polyurethane foams are less changed after gas fume aging than those of the untreated control (foam 1–B).

EXAMPLE 2

A. *Preparation of prepolymer 2–A*

760 parts of a polyester polyol having a hydroxyl number of about 380 (prepared by the conventional methods of condensation polymerization from adipic acid, phthalic anhydride and diethylene glycol), is slowly added at a temperature above 60° C. with stirring to 2550 parts of an isomer mixture of toluenediisocyanate (80% 2,4- and 20% 2,6-isomer) contained in a reactor protected from atmospheric moisture. A temperature rise to about 120° C. occurs. When the temperature subsequently falls below 100° C., external heat is applied. The reactants are brought to a temperature of 100° C. and agitated at 100° C. for 2 hours. The polymeric product obtained has a Brookfield viscosity of about 15,000 cp. at 25° C.

B. *Preparation of the polyester polyurethane foam*

50 parts of prepolymer 2–A, 50 parts of the polyester polyol used in Part 2–A above, and 1 part of an anionic emulsifying agent made from polyoxyethylene sorbitan monopalmitate are vigorously mixed together for 1 minute. Then 0.5 part of dimethylethanolamine and 3.0 parts of water are introduced. The mass is intensively agitated for about 30 seconds and the resulting mixture is poured into a wax-lined mold. The expanding foam rises to fill the mold and becomes tack free. It is cured at 90° C. for 17 hours.

C. *Fume aging of the foam*

(1) The polyester-polyurethane foam is treated (stabilizer introduced) by the procedure of Part C, Example 1. It is then exposed to gas burner fumes for 160 hours. The compression set of the aged foam is 47%.

(2) The polyester-polyurethane foam of Example 2, Part B, is exposed to gas burner fumes for 160 hours. After this treatment is has a compression set of 71%.

(3) The polyester-polyurethane foam of this example is treated by the procedure of Part E, Example 1; the compression sets of the polyurethane foams after exposure to the acid gas fumes, shows that considerable protection has been conferred.

EXAMPLE 3

A. A polyalkyleneether polyurethane foam made according to the procedure of Part B, Example 1, is immersed for about 2 minutes at room temperature in a 2% alcohol solution of 4-methyl-2-mercaptoimidazoline. The foam is then removed, the excess solution is squeezed out and the foam is allowed to dry. It is then subjected to gas fume aging for 160 hours. At the end of this time the modulus of the light yellow foam obtained measures as follows: 0.44 lb./cu. ft. at 25% compression; 0.64 lb./cu. ft. at 50% compression. By way of comparison, the unaged untreated foam displays a modulus of 0.53 lb./cu. ft. at 25% compression and 0.73 lb./cu. ft. at 50% compression.

B. The procedure of Part 3–A above is repeated except that 4-methyl-2-mercaptoimidazoline is not used. The modulus of the brown foam obtained is as follows: 0.38 lb./cu. ft. at 25% compression; 0.57 lb./cu. ft. at 50% compression.

C. The procedure of Part 3–A above is repeated except that 2% solutions of 2-mercaptoimidazoline, 1-(2-hydroxyethyl)-2-mercaptoimidazoline and 1-phenyl-2-mercaptoimidazoline are used in place of a 2% solution of 4-methyl-2-mercaptoimidazoline. A similar degree of protection is afforded to the foams in each case as in Part 3–A of this example.

EXAMPLE 4

A. A sample of the polyalkyleneether polyurethane foam of Part B, Example 1, is immersed for about 2 minutes at room temperature in a 1% ethanolic solution of 1,3-diphenylimidazolidine. The foam is then removed; the excess solution is squeezed out and the foam is dried in air. This foam and an untreated sample are both exposed to gas fumes for 16 hours. At the end of this time, the treated foam remains as white as an unexposed sample. The unprotected sample has yellowed badly.

B. The polyester polyurethane foam of Part B, Example 2, is immersed for about 2 minutes at room temperature in a 1% ethanolic solution of 1,3-diphenyl-imidazolidine; the foam is then removed; the excess solution is squeezed out and the foam is dried in air. This foam and an untreated sample are both subjected to gas fumes for 16 hours. At the end of this time, the unprotected sample is badly discolored; the protected sample remains white.

EXAMPLE 5

A. To 100 parts of prepolymer 1–A is added 0.5 part of polydimethylsiloxane (50 centistokes grade) and 1 part of 1,3-diphenylimidazolidine. To the mixture obtained is added 2.25 parts of water, 1 part of N-methylmorpholine and 0.1 part of triethylamine. The foamable mixture is strongly agitated and poured into a wax-lined mold. The mixture subsequently expands and fills the mold with a low density resilient foam. After 1 hour the foam is removed from the mold and cured by heating at 100° C. for a period of 17 hours.

B. The procedure of Part 5–A above is repeated except that 4-methyl-2-mercaptoimidazoline is employed in place of 1,3-diphenylimidazolidine.

C. The procedure of Part 5–A above is repeated except that no 1,3-diphenylimidazolidine is added.

D. The foams obtained by the procedures of Parts 5–A, 5–B and 5–C above are subjected to gas fume aging for 160 hours. Foams 5–A and 5–B which were treated with the protective agents now display considerably better load strength retention than does the foam (5–C) which has not been protected.

E. Samples of the polyalkyleneether foams prepared in parts 5A, 5B and 5C above are exposed for a period of 2½ months to ambient indoor conditions. At the end of this time it is found that samples 5A and 5B which were treated by the protective agents are far whiter in shade than sample 5C which had not been protected.

EXAMPLE 6

White polyurethane fibers become yellowed when exposed to gas burner fumes. The present invention provides a way of retarding such discoloration as is set forth in this example.

A. *Preparation of polyurethane fiber*

92 parts by weight of polytetramethyleneether glycol (0.092 mole) of molecular weight 1000 are reacted with 8 parts (0.046 mole) of toluene-2,4-diisocyanate under an atmosphere of nitrogen for 3 hours at 80° C. The product of this reaction, in which polyether glycol chains are coupled one or more times by diisocyanate molecules, is called "dimer." 40 parts of the dimer (0.02 mole) are reacted with 10 parts (0.04 mole) of bis-(4-isocyanatophenyl) methane for one hour at 80° C. and diluted with 25 parts of dimethylformamide. The product of this reaction, in which terminal isocyanate groups are placed at the end of each dimer molecule, is called "capped dimer." 15 parts of the diluted capped dimer is "chain extended" by pouring into 0.165 part (0.0033 mole) of hydrazine hydrate in 30 parts of dimethylformamide. The solution of elastomeric polymer so produced contains approximately 19% solids, is of 500 poises viscosity at 30° C., and has an inherent viscosity in hexamethyl phosphoramide of 1.5. This solution is heated to 60° C. and extruded into a co-current stream of 250° C. air as a 15-filament yarn. The time between heating and extrusion of this solution is held to less than one minute. During passage through a 17-foot dry spinning column the filaments are allowed to come into contact and coalesce to give a monofilament of about 200 denier. On emergence from the dry spinning column the monofilament is coated with talc to prevent sticking on the spinning package and is wound up at 300 yards per minute. The talc is removed by a 30-minute boil-off in water prior to testing. Fibers prepared in his way have a tenacity of 1.10 grams per denier, an elongation of 633% at break, and a modulus of 0.11 gram per denier at 200% elongation.

B. Addition of stabilizer to the fiber (1) Skeins of the elastic fiber prepared by the procedure of Part A above are dipped in a 0.5% (by weight) solution of diphenylimidazolidine (DPI) at room temperature. The skeins are then removed and dried.

(2) The procedure of Part B-1 above is repeated except that a 0.1% solution is used.

C. Fume testing of the fibers

The untreated skeins prepared by the procedure of Part A above and the treated skeins prepared by the process of Part B-1 and B-2 above are subjected to gas fume aging (16 hours in a fume chamber maintained at 60° C. by a Fisher burner consuming 2 cubic feet of gas per hour). The following table shows the results obtained.

TABLE

| Exposure Time | Percent Yellowness of Fibers | | |
|---|---|---|---|
| | Untreated | Dipped in 0.5% DPI | Dipped in 0.1% DPI |
| 0 hours | 10.2 | | |
| 16 hours | 42.4 | 14.6 | 16.5 |

The "percent yellow" is measured on a colorimeter. It is given by the expression:

$$\text{Percent yellow} = 100 - 100 \left(\frac{B}{R+G+B}\right) \bigg/ \left(\frac{B_s}{R_s+G_s+B_s}\right)$$

where B, R, G represent the colorimeter readings for light reflected from a yarn sample and filtered respectively through blue, red, and green filters. $B_s$, $R_s$, and $G_s$ are the corresponding values for a standard white reference plate used to zero the instrument. A value of less than 16% yellow is considered good. At about 16%, the yellow becomes perceptible to the eye. The "color break" which occurs at 16% yellow has been found to be distinct enough that in some cases, the colorimeter may be dispensed with in the interest of rapid testing.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A cured polyurethane polymer product stabilized against acidic gas fumes by having incorporated therein from about 0.1 to 2% by weight of a compound taken from the group consisting of a compound having the structure (A) 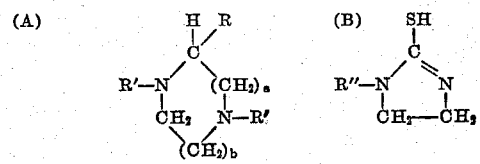

and
(C) 

in which compound R is a radical taken from the group consisting of H, arylene and lower alkyl; R' is an arylene radical; R" is a lower aliphatic radical; R'" is a radical taken from the group consisting of hydrogen and lower alkyl; $a$ is an integer within the range of 0:1 and $b$ is an integer within the range of 1:2 with the proviso that when integer $a$ is 1, integer $b$ is 2.

2. A cured polyurethane polymer product stabilized against acidic gas fumes by having incorporated therein from about 0.1 to 2% by weight of 1,3-diphenylimidazolidine.

3. A cured polyurethane polymer product stabilized against acidic gas fumes by having incorporated therein from about 0.1 to 2% by weight of 2-methyl-1,3-diphenylimidazolidine.

4. A cured polyurethane polymer product stabilized against acidic gas fumes by having incorporated therein from about 0.1 to 2% by weight of 4-methyl-2-mercaptoimidazoline.

5. A cured polyurethane polymer foam product stabilized against acidic gas fumes according to claim 1.

6. A cured polyurethane polymer shaped article product stabilized against acidic gas fumes according to claim 1.

7. A cured polyurethane polymer fiber product stabilized against acidic gas fumes according to claim 1.

8. A cured polyurethane polymer product stabilized against acidic gas fumes by having incorporated therein from about 0.1 to 2% by weight of a compound taken from the group consisting of a compound having the structure (A) 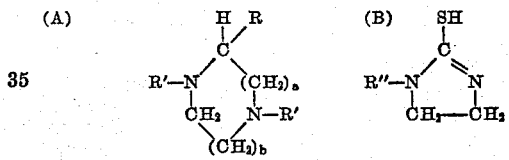

and
(C) 

in which compound R is a radical taken from the group consisting of H, phenyl, lower alkyl substituted phenyl, halogen substituted phenyl, lower alkoxy substituted phenyl, and lower alkyl; R' is taken from the group consisting of phenyl, lower alkyl substituted phenyl, halogen substituted phenyl, lower alkoxy substituted phenyl radicals; R" is a lower aliphatic radical; R'" is a radical taken from the group consisting of hydrogen and lower alkyl; $a$ is an integer within the range of 0:1 and $b$ is an integer within the range of 1:2 with the proviso that when integer $a$ is 1, integer $b$ is 2.

References Cited in the file of this patent

UNITED STATES PATENTS

| 2,700,028 | Jarboe | Jan. 18, 1955 |
| 2,702,797 | Rugg | Feb. 22, 1955 |